US007885501B2

(12) United States Patent
Patlakh

(10) Patent No.: US 7,885,501 B2
(45) Date of Patent: Feb. 8, 2011

(54) HIGHLY FLEXIBLE WATER-PROOF, RODENT-PROOF CABLES PARTICULARLY USEFUL AS OPTICAL COMMUNICATION CABLES

(75) Inventor: Anatoly Patlakh, Holon (IL)

(73) Assignee: Teldor Wires & Cables Ltd., Kibbutz Ein Dor (IL)

( * ) Notice: Subject to any disclaimer, the term of this patent is extended or adjusted under 35 U.S.C. 154(b) by 367 days.

(21) Appl. No.: 12/003,603

(22) Filed: Dec. 28, 2007

(65) Prior Publication Data

US 2008/0247717 A1    Oct. 9, 2008

(30) Foreign Application Priority Data

Jan. 2, 2007   (IL) .................................. 180507

(51) Int. Cl.
G02B 6/44   (2006.01)
(52) U.S. Cl. .................. 385/100; 385/115; 385/123; 385/126; 385/127
(58) Field of Classification Search ............ 385/100, 385/115, 123, 126, 127
See application file for complete search history.

(56) References Cited

U.S. PATENT DOCUMENTS 5,072,073 A    12/1991 Becker et al.

6,233,384 B1    5/2001 Sowell, III et al.
6,681,070 B2 *  1/2004 Cecchi et al. ............... 385/109
7,006,740 B1 *  2/2006 Parris ......................... 385/109

FOREIGN PATENT DOCUMENTS

| EP | 0595535 | 5/1994 |
| EP | 0924543 | 6/1999 |
| EP | 1491580 | 12/2004 |
| WO | WO 97/38424 | 10/1997 |

OTHER PUBLICATIONS

European Search Report and the European Search Opinion Dared May 6, 2008 From the European Patent Office Re.: Application No. 07123940.4.
Office Action Dated Feb. 2, 2010 From the Israel Patent Office Re.: Application No. 180507 and Its Translation Into English.
Response Dated Jul. 14, 2010 to Office Action of Feb. 2, 2010 From the Israel Patent Office Re.: Application No. 180507.
Draka "S670T Armoured Marine Fiber Optic Cable: Fiber Optic Cable-Armoured Tight Buffer Construction", Draka Cabieteq / Marine, Oil & Gas International, 2 P.

(Continued)

*Primary Examiner*—Jennifer Doan

(57) ABSTRACT

A highly flexible water-proof, rodent-proof cable, comprising an optically or electrically conductive center region, a layer of a yarn of high tensile strength and water blocking properties overlying the center region, a layer of soft annealed steel wires in the form of a braid overlying the yarn layer, and an outer jacket of a polymeric material overlying the steel-wire layer.

15 Claims, 1 Drawing Sheet

OTHER PUBLICATIONS

Draka Comteq "Data Transmission Cables 827.50 With Type Designation(s) P/N S70T-NN-XXY Armored and Sheathed", Draka Comteq USA, Det Norske Veritas Type Approval Certificate No. E-7155, 4 P, Nov. 10, 2004.

Kevlar "A Brief History of Kevlar: 1 Trick of A Tiny Belly: Cut Down A Bit of Your Belly Every Day by Using This 1 Weird Old Tip", About.Com: Composites/Plastics, 1 P.

Kevlar "Is Kevlar Waterproof?", Wiki.Answers.Com, 1 P.

Rules and Regulations Under the Textile Fiber Products Identifiction Act 16 CFR Part 303 Defining Aramid, Federal Trade Commission Protecting America's Consumers.

Letter From Luedeka, Neely & Graham, P.C. Dated Nov. 15, 2010 to U.S. Appl. No. 12/003,603: References of Interest LNG Ref. No. 66547.00 / C-1229.5.

* cited by examiner

HIGHLY FLEXIBLE WATER-PROOF, RODENT-PROOF CABLES PARTICULARLY USEFUL AS OPTICAL COMMUNICATION CABLES

RELATED APPLICATION

This application claims the benefit of Israel Patent Application no. 180507 filed on Jan. 2, 2007.

FIELD AND BACKGROUND OF THE INVENTION

The present invention relates to highly flexible water-proof, rodent-proof cables. The invention is particularly useful with respect to optical communication cables, such as used by the military for rapid and/or multiple deployment in the field, and is therefore described below with respect to this type of cable.

The military uses a wide variety of cables, both of the electrical-conductor type as well as the optical-fiber type, which are deployed in the field to provide communication with respect to various activities involved in a field operation. Such cables must be able to withstand the harsh field environments, which frequently include exposure to mice, rats and other rodents, who may gnaw or attack the cable. In addition, such cables must also be water-proof, relatively light weight, and highly flexible to permit storage on small man operated reels and rapid deployment as needed.

At the present time, relatively rigid corrugated steel tapes or fiberglass rods are used to provide rodent protection to cables. However, such constructions are either too heavy and stiff for military use and the rapid deployment, or they do not offer the required protection, particularly with respect to being rodent-proof and water-proof, and still be sufficiently light and flexible so as to permit rapid deployment.

OBJECTS AND BRIEF SUMMARY OF THE PRESENT INVENTION

An object of the present invention is to provide a highly flexible water-proof, rodent-proof cable having advantages in one or more of the above respects.

According to a broad aspect of the invention, there is provided a highly flexible water-proof, rodent-proof cable of sufficiently high flexibility and low weight to permit rapid deployment, said cable comprising: an optically or electrically conductive center region; a layer of a yarn of high tensile strength and water blocking properties overlying said center region, said yarn layer being a long-chain synthetic polyamide in which at least 85 per cent of the amide linkages are attached directly between two aromatic rings; a braid of soft annealed steel wires overlying said yarn layer; and an outer jacket of an extruded polymeric material overlying said steel-wire layer.

In the described preferred embodiment, the center region includes one or more optical fibers each including an optical fiber core and a cladding thereover. Each of the optical fibers further includes a primary coating over the cladding, and a secondary coating of a polyester elastomer over the primary coating. Preferably, the cladding has an outer diameter of 0.12-0.13 mm, the primary coating has an outer diameter of 0.23-0.27 mm, and the secondary coating has an outer diameter of 0.8-1.0 mm.

According to further features in the preferred embodiment of the invention described below, the braid of soft, annealed steel wires includes two contra-helical layers having a coverage of up to 95 per cent, with the steel wires having an outer diameter of 2.7-3.3 mm.

According to further features in the described preferred embodiment, the cable further includes an inner jacket of an extruded polymeric material between the yarn layer and the steel-wire layer. The inner jacket is preferably a thermoplastic polyurethane, and has a wall thickness of 0.4-0.6 mm.

Preferably, the yarn is an aromatic polyamide with the yarn having an outer diameter of 0.8-1.0 mm.

In the described preferred embodiment, the outer jacket is an extruded polyether based black ultra-violet-resistant thermoplastic polyurethane, and has an outer diameter of 6.5-7.5 mm.

Cables may be constructed in accordance with the foregoing features to provide a high degree of water-proof and rodent-proof properties, and yet to be relatively light and flexible so as to permit rapid and convenient deployment in the field. Such cables, therefore, have been found to be particularly useful for military applications, but it will be appreciated that they could be used in many other applications as well requiring the foregoing properties.

Further features and advantages of the invention will be apparent from the description below.

BRIEF DESCRIPTION OF THE DRAWING

The invention is herein described, by way of example only, with reference to the accompanying drawing, wherein.

Figure 1:
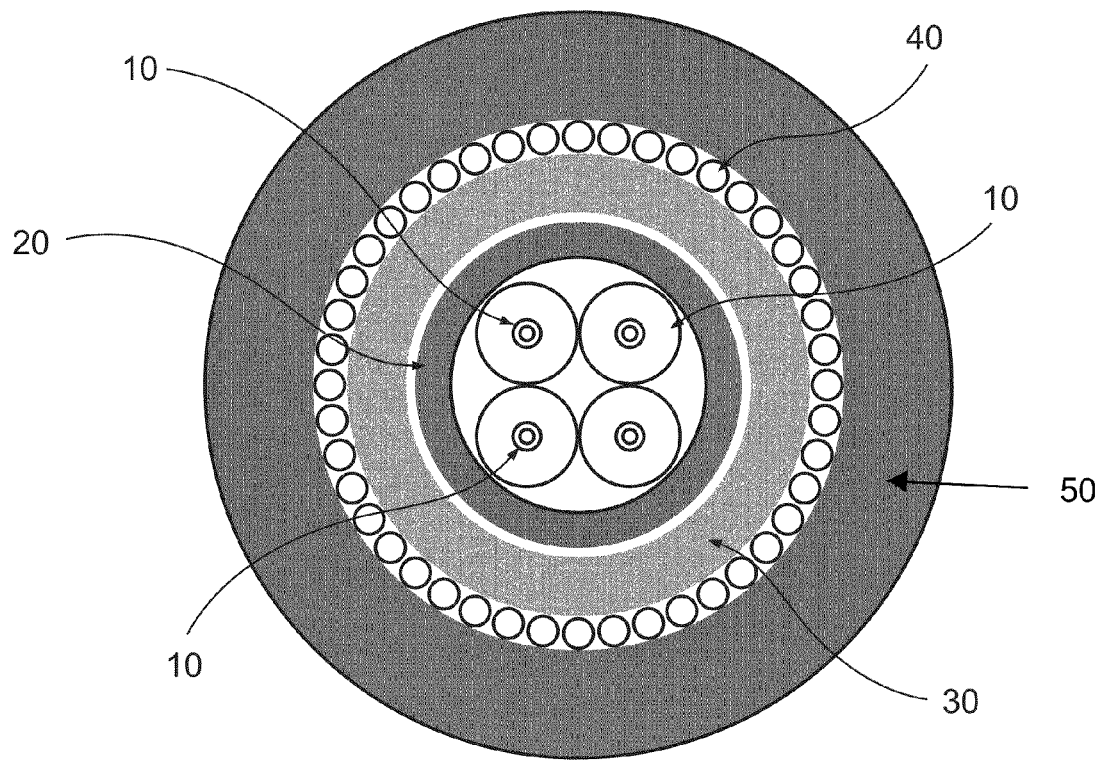
FIG. 1 is a cross-sectional view illustrating one form of cable constructed in accordance with the present invention.

It is to be understood that the foregoing drawing, and the description below, are provided primarily for purposes of facilitating understanding the conceptual aspects of the invention and possible embodiments thereof, including what is presently considered to be a preferred embodiment. In the interest of clarity and brevity, no attempt is made to provide more details than necessary to enable one skilled in the art, using routine skill and design, to understand and practice the described invention. It is to be further understood that the embodiments described are for purposes of example only, and that the invention is capable of being embodied in other forms and applications than described herein.

DESCRIPTION OF A PREFERRED EMBODIMENT

The drawings illustrate a preferred structure of a cable constructed in accordance with the invention, and having water-proof and rodent-proof properties. Such a cable is also sufficiently light and flexible, to make it particularly useful as a military cable for quick and rapid deployment in the field when and where required. While the illustrated cable is particularly useful as a military cable, it will be appreciated that it could be used in many other applications requiring corresponding properties.

The cable illustrated in the drawing is a fiber-optic cable, and includes the following: four optical fibers 10 in the central region; a layer 20 of a yarn of high tensile strength and water-blocking properties overlying the four optical fibers; an inner jacket 30 overlying the yarn layer; a layer 40 of soft annealed steel wires overlying the yarn layer 20 and the inner jacket 30; and an outer jacket 50 of a polymeric material overlying the steel-wire layer 40.

Figure 2:
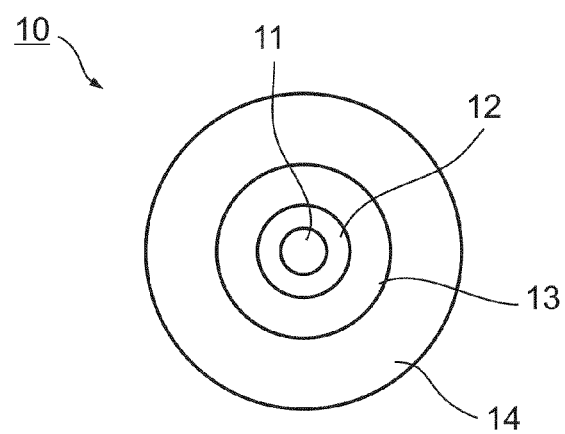
FIG. 2 is an enlarged sectional view of one of the optical fibers included in the cable of FIG. 1.

Each of the optical fibers 10 in the central region of the cable may be of a conventional construction. Thus, as shown in FIG. 2, it includes an optical fiber core 11 of silica, a cladding 12 thereover, a primary coating 13 over the cladding, and a secondary, protective coating 14 of a thermoplastic polyester elastomer. In the embodiment illustrated in FIGS. 1 and 2, the outer diameter of the cladding 12 is preferably 0.12-0.13 mm, most preferably 0.125 mm; the outer diameter of the primary coating 13 is preferably is 0.23-0.27 mm, most preferably 0.250 mm; and the outer diameter of the secondary coating 14 is preferably 0.80-1.0 mm, most preferably 0.9 mm. The four optical fibers 10 are preferably stranded with a consistent pitch length.

The yarn layer 20 is preferably of a synthetic yarn made of a long-chain synthetic polyamide in which at least 85 percent of the amide (—CO—NH—) linkages are attached directly between two aromatic rings. Preferably, this layer is formed of an Aramid fiber, supplied I.E. Dupont de Nemours Inc. or Teijin Twaron BV; it has high tensile strength of at least 2500 N and longitudinal water blocking properties. The synthetic yarn of layer 20 preferably has an outer diameter of 0.80-1.00 mm, most preferably 0.90 mm.

The inner jacket 30 is of an extrudable polyether based thermoplastic polyurethane, and is extruded over the yarn layer 20. Preferably, the wall thickness of the inner jacket 30 is 0.4-0.6 mm, most preferably 0.5 mm.

The layer 40 of soft annealed steel wires is preferably applied as a braid over the inner jacket 30. For example, it may be in the form of the helically-applied braid, preferably two contra-helical layers having a coverage of up to 95 percent, and as low as 25 percent in some cases. Preferably, the steel wires of this layer have an outer diameter of 2.7-3.3 mm, most preferably 3.0 mm.

The outer jacket 50 is preferably an extrudable polyether based black ultra-violet-resistant thermoplastic polyurethane extruded over the wire layer 40. The outer jacket 50 has an outer diameter preferably of 6.5-7.5 mm, most preferably of 7.0 mm.

As indicated earlier, a cable made as described above with respect to FIGS. 1 and 2 has high water-proof and rodent-proof properties, and yet can be constructed to be sufficiently flexible and of low weight to enable its use for rapid deployment in military applications.

While the invention has been described with respect to one preferred embodiment, it will be appreciated that this is set forth merely for purposes of example, and that many variations and modifications can be made. For example, the cable could be constructed with a central region occupied by electrically-conductive wires, rather than optical fibers, and a different number of fibers or wires could be used, e.g., up to four. Preferably, the optical fibers (or electrically-conductive wires) are stranded with a consistent pitch length. The types of optical fibers used can be graded and step indexed, single and multi mode. The types of conductors can be altered to include copper-based wires or pairs. Further, the steel wires of layer 40 can be applied directly over the synthetic-yarn layer 20, i.e., omitting the inner jacket 30.

Many other variations, modifications and applications of the illustrated embodiment will be apparent.

What is claimed is:

1. A highly flexible water-proof, rodent-proof cable of sufficiently high flexibility and low weight to permit rapid deployment, said cable comprising:
   an optically or electrically conductive center region;
   a layer of a yarn of high tensile strength and water blocking properties overlying said center region, said yarn layer being a long-chain synthetic polyamide in which at least 85 percent of the amide linkages are attached directly between two aromatic rings;
   a braid of soft annealed steel wires overlying said yarn layer;
   and an outer jacket of an extruded polymeric material overlying said steel-wire layer.

2. The cable according to claim 1, wherein said center region includes one or more optical fibers each including an optical fiber core and a cladding thereover.

3. The cable according to claim 2, wherein each of said optical fibers further includes a primary coating over said cladding, and a secondary coating of a polyester elastomer over said primary coating.

4. The cable according to claim 3, wherein said cladding has an outer diameter of 0.12-0.13 mm, said primary coating has an outer diameter of 0.23-0.27 mm, and said secondary coating has an outer diameter of 0.8-1.0 mm.

5. The cable according to claim 1, wherein the steel-wire braid is in the form of two contra-helical layers having a coverage of up to 95 per cent.

6. The cable according to claim 1, wherein said cable further includes an inner jacket of an extrudable polymeric material between the yarn layer the said steel-wire layer.

7. The cable according to claim 6, wherein said inner jacket is an extruded thermoplastic polyurethane having a wall thickness of 0.4-0.6 mm.

8. The cable according to claim 1, wherein the yarn of the yarn layer has an outer diameter of 0.80-1.0 mm.

9. The cable according to claim 1, wherein said outer jacket is an extrudable polyether based black ultra-violet-resistant thermoplastic polyurethane.

10. The cable according to claim 9, wherein said outer jacket has an outer diameter of 6.5-7.5 mm.

11. A water-proof, rodent-proof optical cable of sufficiently high flexibility and low weight to permit rapid deployment, said cable comprising:
    a plurality of optical fibers each including an optical fiber core, a cladding thereover, a primary coating over the cladding, and a secondary coating over said primary coating;
    a layer thereover of a yarn made of a long-chain synthetic polyamide in which at least 85 per cent of the amide linkages are attached directly between two aromatic rings;
    a layer of soft, annealed, steel-wires in the form of a braid overlying said yarn layer;
    and an outer jacket of a polymeric material overlying the layer of steel wires.

12. The cable according to claim 11, wherein said steel wires have an outer diameter of 2.7-3.3 mm, and said outer jacket has an outer diameter of 6.5-7.5 mm.

13. The cable according to claim 12, wherein the cable further includes an inner jacket of a polymeric material between layer the of yarn and the layer of soft annealed steel wires, said inner jacket being a thermoplastic polyurethane having a wall thickness of 0.4-0.6 mm.

14. The cable according to claim 13, wherein said yarn is an aromatic polyamide and has an outer diameter of 0.8-1.0 mm.

15. The cable according to claim 14, wherein said outer jacket is a polyether based black ultra-violet resistant thermoplastic polyurethane.

* * * * *